United States Patent
D'Oosterlinck et al.

(10) Patent No.: US 11,067,885 B2
(45) Date of Patent: Jul. 20, 2021

(54) LASER PROJECTION ILLUMINATION SYSTEM

(71) Applicant: BARCO NV, Kortrijk (BE)

(72) Inventors: Wouter D'Oosterlinck, Eeklo (BE); Peter Janssens, Nazareth (BE); Nico Coulier, Machelen (BE)

(73) Assignee: BARCO NV, Kortrijk (BE)

( * ) Notice: Subject to any disclaimer, the term of this patent is extended or adjusted under 35 U.S.C. 154(b) by 554 days.

(21) Appl. No.: 15/301,673

(22) PCT Filed: Apr. 4, 2014

(86) PCT No.: PCT/EP2014/056882
§ 371 (c)(1),
(2) Date: Oct. 3, 2016

(87) PCT Pub. No.: WO2015/149877
PCT Pub. Date: Oct. 8, 2015

(65) Prior Publication Data
US 2017/0115554 A1  Apr. 27, 2017

(51) Int. Cl.
*G03B 33/12* (2006.01)
*G02B 27/48* (2006.01)
(Continued)

(52) U.S. Cl.
CPC ......... *G03B 33/12* (2013.01); *G02B 27/0905* (2013.01); *G02B 27/0922* (2013.01);
(Continued)

(58) Field of Classification Search
CPC ............ G03B 21/2033; G03B 21/2013; G03B 21/2066; G03B 21/2073; G03B 21/208;
(Continued)

(56) References Cited

U.S. PATENT DOCUMENTS

| | | | |
|---|---|---|---|
| 7,475,993 B2 * | 1/2009 | Takeda | G03B 21/2033 348/E9.026 |
| 8,066,389 B2 | 11/2011 | Silverstein et al. | |

(Continued)

FOREIGN PATENT DOCUMENTS

| | | |
|---|---|---|
| CN | 1914929 A | 2/2007 |
| CN | 101000458 A | 7/2007 |

(Continued)

OTHER PUBLICATIONS

Communication from EPO in related European application EP 14718935.1-1020 dated Jul. 23, 2018.
(Continued)

*Primary Examiner* — Jerry L Brooks
(74) *Attorney, Agent, or Firm* — Hamre, Schumann, Mueller & Larson, P.C.

(57) ABSTRACT

A light beam projecting arrangement including a first cluster of light sources arranged to provide a first cluster of light beams having a first etendue and a second cluster of light sources arranged to provide a second cluster of light beams having a second etendue, and means for changing the direction of the first cluster and/or the second cluster of light beams. The light sources are arranged so that the total etendue of the first cluster of light beams is substantially equal to the etendue of the second cluster of light beams; and where the means for changing the direction are arranged so that the clusters of light beams are brought into a combined cluster light beam having substantially the same etendue as the larger one of the first etendue and the second etendue.

20 Claims, 8 Drawing Sheets

(51) Int. Cl.
 *G03B 21/20* (2006.01)
 *G02B 27/28* (2006.01)
 *G02B 27/14* (2006.01)
 *G02B 27/09* (2006.01)
 *H04N 9/31* (2006.01)

(52) U.S. Cl.
 CPC ........... *G02B 27/14* (2013.01); *G02B 27/283* (2013.01); *G02B 27/48* (2013.01); *G03B 21/208* (2013.01); *G03B 21/2013* (2013.01); *G03B 21/2033* (2013.01); *G03B 21/2066* (2013.01); *G03B 21/2073* (2013.01); *H04N 9/3161* (2013.01)

(58) Field of Classification Search
 CPC ...... G02B 27/14; G02B 27/283; G02B 27/48; G02B 27/0922; G02B 27/0905; H04N 9/3161
 USPC .......................................................... 353/20
 See application file for complete search history.

(56) References Cited

U.S. PATENT DOCUMENTS

| | | | |
|---|---|---|---|
| 2005/0174768 A1 | 8/2005 | Conner | |
| 2006/0007538 A1* | 1/2006 | Robinson | G02B 27/102 359/487.04 |
| 2007/0165185 A1* | 7/2007 | Chen | G03B 21/2013 353/20 |
| 2008/0019010 A1* | 1/2008 | Govorkov | B23K 26/0613 359/641 |
| 2010/0245774 A1* | 9/2010 | Okuda | G02B 6/0008 353/31 |
| 2013/0162956 A1* | 6/2013 | Okuda | G03B 21/2066 353/30 |
| 2015/0177523 A1* | 6/2015 | Tian | G02B 27/0977 359/618 |

FOREIGN PATENT DOCUMENTS

| | | |
|---|---|---|
| CN | 101051176 A | 10/2007 |
| CN | 102411205 | 4/2012 |
| CN | 102566214 A | 7/2012 |
| CN | 103261964 A | 8/2013 |
| CN | 203217229 U | 9/2013 |
| EP | 2043211 A2 | 4/2009 |
| WO | 2012/139634 A1 | 10/2012 |
| WO | 2014005612 A1 | 1/2014 |

OTHER PUBLICATIONS

Chinese Office Action dated Sep. 22, 2017, for CN 201480077900.4, and English translation thereof.
Chinese Office Action in related Chinese Application No. 201480077900.4, dated Apr. 23, 2018.
International Search Report (ISR) dated Jan. 7, 2015, for PCT/EP2014/056882.
Written Opinion dated Jan. 7, 2015, for PCT/EP2014/056882.
Second Written Opinion dated Feb. 23, 2016, for PCT/EP2014/056882.
International Preliminary Report on Patentability (IPRP) dated May 11, 2016, for PCT/EP2014/056882.
Chinese Office Action in related Chinese Application No. 201480077900.4, dated Oct. 9, 2018.
Taiwanese Office Action in corresponding Taiwanese Application No. 104110854, dated Mar. 7, 2019.
Chinese Office Action in corresponding Chinese application 201480077900.4 dated Jul. 1, 2019.
Chinese Office Action in corresponding Chinese application 201480077900.4 dated Feb. 3, 2020.
European Office Action in corresponding European Application No. 14718935.1 dated May 12, 2020.

* cited by examiner

Detector Image: Radiance in angle space

20/01/2014
Detector 65, NSCG Surface 1: det before diff 1
Size X: -25.000 to 25.000, Y: -25.000 to 25.000 deg, Pixels 100 W X 100 H, Total Hits = 61232
Peak Radiance  : 1.9597E+003 Watts/cm^2/Steradian
Total Power    : 5.3578E+001 Watts

Fig. 6b

Detector Image: Radiance in angle space

20/01/2014
Detector 59, NSCG Surface 1: det after diff 2
Size X: -25.000 to 25.000, Y: -25.000 to 25.000 deg, Pixels 100 W X 100 H, Total Hits = 61216
Peak Radiance  : 1.3127E+002 Watts/cm^2/Steradian
Total Power    : 5.3564E+001 Watts

LASER PROJECTION ILLUMINATION SYSTEM

The present invention relates to a projection illumination system and to a method of operating or manufacturing a projection illumination system.

BACKGROUND

Laser based projection systems are considered to be a promising technology for (high-end) projection due to their high lifetime, saturated colors, stable light output, etc. Two focus areas in this field are how to increase the efficiency and how to deal with the speckle phenomenon. For example, international patent application publication WO2012/139634 A1, in the name of the present applicant, describes how to decrease the impact of the speckle behaviour by using an increased diffusing power.

Laser based projection systems involve distinct red, green and blue light sources that can provide primary light beams or primary colors. A primary cluster light beam can comprise a plurality of individual light beams. There is an angular and spatial distribution associated with a cluster light beam. The angular distribution is the spread in angles or directions of the individual light beams and the spatial distribution is the spread of the volumes of the individual light beams in space.

Above a certain level of angular and spatial spread, color and brightness artefacts might be noticeable by the viewer. For example, if the system is affected by vignetting towards the image corners and there is a big difference in angular distribution of the light of the primary colors, light of one color might get clipped more towards the corners, resulting in a shift in overall color distribution. Further, a large spread of the angular and spatial distribution between the primary colors will reduce the efficiency of any use of diffusive-based de-speckling techniques later in the system.

Prior art shows an interest in minimizing the etendue of the light beams in a system in order to decrease light losses. The etendue of a light beam which consists of several light sources is related to how close the light beams can be positioned to each other. Fiber coupling based laser light sources is commonly used for this purpose since it can provide a dense optical packing of the lasers. However there are undesirable light losses associated with the fiber coupling technique. Further, fiber based solutions needs fiber optics for every laser which increases cost and complexity.

U.S. Pat. No. 8,066,389 discloses a beam alignment chamber for reducing the etendue, but it does not teach how to match the etendues of the several cluster light beams that are to be combined in a combiner rod and/or blended.

SUMMARY OF THE INVENTION

It is an object of the present invention to provide an alternative projection illumination system, a method of operating or manufacturing a projection illumination system.

The present invention seeks to obtain a blended laser beam (e.g., a white cluster light beam, for use in illumination or projection systems) with increased efficiency and a reduced speckle effect, using free space coupling, or direct coupling. This is obtained by matching the angular and spatial spread between the primary cluster beams, i.e. to make the angular and spatial intensity distributions of the different primary beams to be as close as possible. The invention will also make it possible to have a more integrated design.

The different laser beams occupy a small etendue space and allow the use of more powerful diffusers for angular de-speckling.

The matching is done by configuring the grid of the laser sources in the cluster beam so that the required power is evenly distributed in the cluster beam. Further should the cluster beam for the different clusters have the same beam divergence and beam size. The individual beams may have different beam divergence, although it is preferred to select sources that provide a relatively uniform angular spread. For more divergent individual beams, the corresponding grid can be decreased and a beam expander can be employed to match its cluster beam with the other cluster beams.

Cluster beams of the same wavelength (range) may be combined by means of varying the polarization while cluster beams of different wavelength (ranges) may be combined as such.

If the blended beam will enter an integrating rod, it might not fill the total available space. One or more blended beams can then be employed next to the first one.

According to an aspect of the invention, there is provided a light beam projecting arrangement comprising: a first cluster of light sources arranged to provide a first cluster of light beams having a first etendue and a second cluster of light sources arranged to provide a second cluster of light beams having a second etendue, and means for changing the direction of the first cluster and/or the second cluster of light beams; wherein the light sources are arranged so that the total etendue of the first cluster of light beams is substantially equal to the etendue of the second cluster of light beams; and wherein the means for changing the direction are arranged so that the clusters of light beams are brought into a combined cluster light beam having substantially the same etendue as the larger one of the first etendue and the second etendue.

It is an advantage of the invention that it efficiently provides a high power cluster beam with a limited etendue and with reduced speckling.

In an embodiment of the light beam projection arrangement according to the present invention, the clusters of light sources are arranged so that their respective clusters of light beams pass a light deviation system, which changes the direction of one or several individual light beams so that the individual light beams becomes positioned closer to each other and the etendue of the corresponding cluster of light beams is reduced.

The embodiment is based on the inventive insight of the inventors that individual light beams can advantageously be manipulated to improve the etendue of the cluster light beams.

In a particular embodiment, the light deviation system comprises a mirror system, the mirror system having a mirror substrate with a coating deposited on selected areas thereof, such that the mirror changes the direction of a selection of the individual light beams.

It is an advantage of this embodiment that it efficiently changes the direction of individual light beams and combines them.

In an embodiment of the light beam projection arrangement according to the present invention, the light sources are arranged so that their corresponding light beams pass a beam expander.

It is an advantage of this embodiment that it efficiently adjusts the spatial extent of the cluster light beams.

In an embodiment of the light beam projection arrangement according to the present invention, the polarization of the light beams in the first cluster of light beams is different from the polarization of the light beams in the second cluster of light beams.

It is an advantage that the light beams can be combined without risking interference effects, as light beams with different polarizations will not interfere.

In an embodiment of the light beam projection arrangement according to the present invention, the polarization of one of the light beams is altered by rotating the corresponding light sources.

This is a particularly advantageous way of obtaining orthogonal (non-interfering) polarization directions for the respective beams. Optionally, the light sources are rotated per cluster, e.g. by rotating the housing in which the cluster of light sources are comprised.

In an embodiment of the light beam projection arrangement according to the present invention, the polarization of the light beams within one cluster of light beams are different from each other.

The advantage of combining beams without inteference can be used advantageously both at the level of clusters to be combined, and at the level of individual beams to be combined within a cluster.

In an embodiment of the light beam projection arrangement according to the present invention, a set of light beams comprises light around one or more wavelength ranges.

In an embodiment, the light beam projection arrangement according to the present invention further comprises a third cluster of light sources arranged to provide a third cluster of light beams, wherein the first cluster of light beams comprises red light beams, wherein the second cluster of light beams comprises blue light beams, wherein the third cluster of light beams comprises green light beams, and wherein the first, second, and third clusters are blended so that the blended light beam appears white.

This arrangement is particularly useful in illumination or projection applications, where white light is the basis for visualizing different colors.

According to an aspect of the present invention, there is provided a projection system comprising the light beam projecting arrangement described above.

According to an aspect of the present invention, there is provided a light guiding arrangement for use with a first cluster of light sources arranged to provide a first cluster of light beams having a first etendue and a second cluster of light sources arranged to provide a second cluster of light beams having a second etendue, the light guiding arrangement comprising: means for changing the direction of said first cluster and/or said second cluster of light beams; means for arranging said light sources so that the total etendue of the first cluster of light beams is substantially equal to the etendue of the second cluster of light beams; and wherein the means for changing the direction are arranged so that the clusters of light beams are brought into a combined cluster light beam having substantially the same etendue as the larger one of said first etendue and said second etendue.

In an embodiment, the light guiding arrangement according to the present invention further comprises a light deviation system adapted to receive respective clusters of light beams from said clusters of light sources, said light deviation system being adapted to change the direction of one or several individual light beams so that the individual light beams become positioned closer to each other and the etendue of the corresponding cluster of light beams is reduced.

In a particular embodiment, the light deviation system comprises a mirror system, the mirror system having a mirror substrate with a coating deposited on selected areas thereof, such that the mirror changes the direction of a selection of the individual light beams.

In an embodiment, the light guiding arrangement according to the present invention further comprises a beam expander adapted to receive corresponding light beams of the light sources.

In an embodiment, the light guiding arrangement according to the present invention further comprises means for making the polarization of the light beams in the first cluster of light beams different from the polarization of the light beams in the second cluster of light beams.

In an embodiment, the light guiding arrangement according to the present invention further comprises means for rotating the corresponding cluster of light sources to alter the polarization of one of the light beams.

In an embodiment, the light guiding arrangement according to the present invention further comprises means for setting the polarization of the light beams within one cluster of light beams different from each other.

In an embodiment, the light guiding arrangement according to the present invention is adapted for use with a cluster of light beams comprising light around one or more wavelength ranges.

According to an aspect of the present invention, there is provided a method of projecting light beams comprising: providing a first cluster of light beams having a first etendue; providing a a second cluster of light beams having a second etendue; and changing the direction of said first cluster and/or said second cluster of light beams; wherein the total etendue of the first cluster of light beams is substantially equal to the etendue of the second cluster of light beams; and wherein the clusters of light beams are brought into a combined cluster light beam having substantially the same etendue as the larger one of said first etendue and said second etendue.

In an embodiment, the method of projecting light beams according to the present invention further comprises changing the direction of one or several individual light beams so that the individual light beams becomes positioned closer to each other and the etendue of the corresponding cluster of light beams is reduced.

In an embodiment of the method of projecting light beams according to the present invention, the polarization of the light beams in the first cluster of light beams is different from the polarization of the light beams in the second cluster of light beams.

In an embodiment, the method of projecting light beams according to the present invention further comprises altering the polarization of one of the light beams.

In an embodiment of the method of projecting light beams according to the present invention, the polarization of the light beams within one cluster of light beams are different from each other.

In an embodiment of the method of projecting light beams according to the present invention, a cluster of light beams comprises light around one or more wavelength ranges.

In an embodiment, the method of projecting light beams according to the present invention further comprises providing a third cluster of light beams, wherein said first cluster of light beams comprises red light beams, wherein said second cluster of light beams comprises blue light beams, wherein said third cluster of light beams comprises green light beams, and wherein said first, second, and third clusters are blended so that the blended light beam appears white.

The technical effects and advantages of embodiments of the light guiding arrangement and of the method according to the present invention correspond, mutatis mutandis, to those of the corresponding embodiments of the light beam projection arrangement according to the present invention.

BRIEF DESCRIPTION OF THE DRAWINGS

These and other technical effects and advantages of embodiments of the present invention will now be described with reference to the attached drawings, in which:

FIG. 5 shows

DETAILED DESCRIPTION OF THE INVENTION

Figure 1:
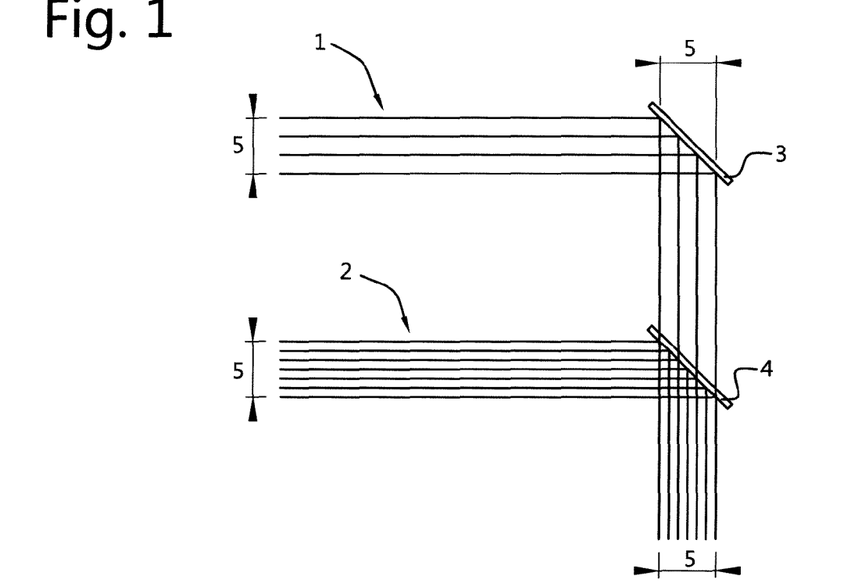
FIG. 1 shows an embodiment of the present invention where two cluster beams are matched.

FIG. 1 shows an example of an embodiment of the present invention with two cluster beams 1 and 2 and dichroic mirrors 3 and 4 to alter the direction of the light beams. The three-dimensional nature of light beams makes the number of visible beams in a two dimensional snapshot like FIG. 1 to depend on the beam distribution and the angle of the two-dimensional view. The etendue of an individual beam of cluster 1 may be different than the etendue of an individual beam of set 2. It is however crucial that the etendues of the cluster beams 1 and 2 are equal as well as the etendue of the final beam leaving mirror 4. The two-dimensional projection of this etendue is indicated in FIG. 1 by 5.

Figure 2:
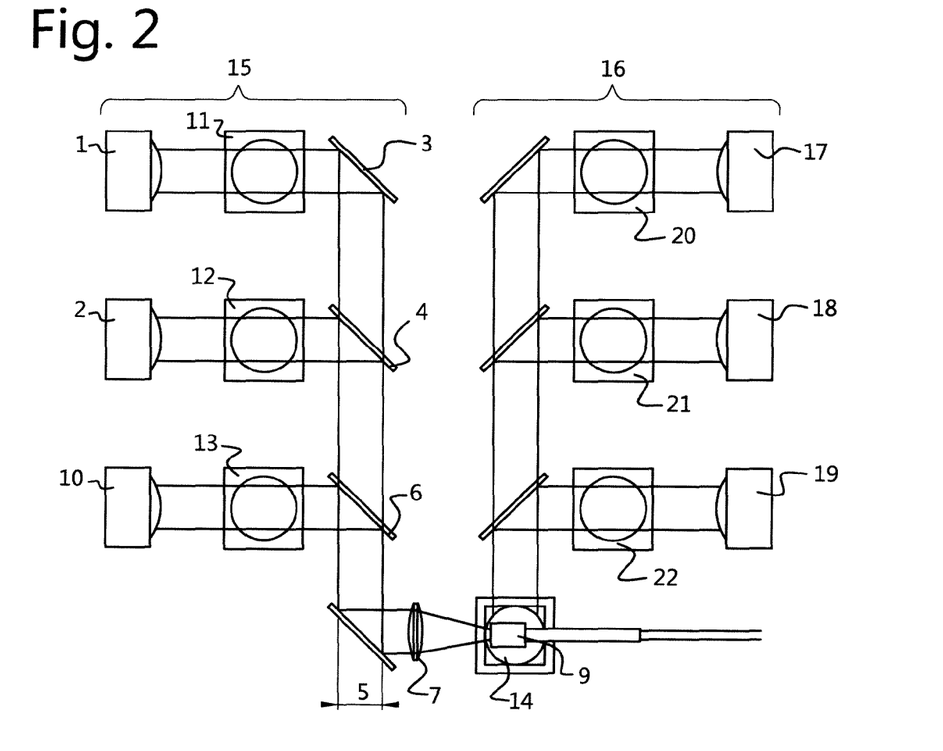
FIG. 2 shows an embodiment of a system implementation of the present invention where several clusters are employed.

FIG. 2 shows an overview of an embodiment of the present invention.

Light beams 1 and 2 are here presented in a system configuration where 1 and 2 could for example be blue and green light. A third light beam 10 is added; this could for example be red light. 1, 2 and 10 contribute to the left sub-system 15. For each light source 1, 2 and 10 there is a second light source of the same color 11, 12, 13, where the polarization of the light is rotated to an orthogonal position with respect to the first light source. This can be done by physically rotating the light sources (either individually, or as a cluster). By rotating the housing of a cluster of light sources, it is possible to use the same housing for the two polarization directions. This modular construction is beneficial for production and maintenance.

A second sub-system 16 may be added if there is still unused system etendue. The light beams 17, 18 and 19 are here complemented with light beams 20, 21 and 22, the latter group of light beams having different polarization than the first group of light beams. Adding light with orthogonal polarization does not increase the etendue, but since orthogonally polarized light beams cannot interfere with each other, this additional spread in polarization reduces the speckle-effect. The angular spread between the light of different wavelengths (possibly within a small wavelength band) should still be as close as possible. The wavelengths could reside within a wavelength band that is sufficiently small not to cause color effects discernible for the human eye, but it will reduce the speckle effect. All individual beams of subsystem 15 are focused by a converging lens 7 and enters onto the beam combiner 14. There is a corresponding converging lens of sub-system 16 (not shown in FIG. 2). The beam combiner 14 could be a prism or a dichroic mirror or the like. The optical component 9 is not specific to the present invention; it could for example be an integrator rod or another component that adds diffusive power, or any optical component of convenience.

The system in FIG. 2 provides a decreased speckle effect, improved colour uniformity and high efficiency.

The speckle effect is decreased by the introduction of polarization differences for light beams of the same wavelengths. The introduction of the small wavelength bands around each targeted wavelength is a further mean to break symmetry that can result in speckles.

The improved colour uniformity arises from that the individual light beams of all cluster beam are evenly distributed all the way out to the envelope of the light beam. Since the envelope of a light beam is determined by its etendue, it is thus crucial that the etendues of the different cluster beams are as close to equal as possible. Moreover, the angular spread of the different cluster beams also have to be close to each other. Differences in the angular spread will translate to a spatial difference when the beam is magnified and hence result in a non-uniform light beam distribution. For the blended light beam this will appear as colour shifts.

The present invention makes it possible to increase efficiency of the overall system. In one aspect there will be no light loss when the light enters the correction optics after the beam combiner 14. Since the blended beam has uniform distribution of different wavelengths it can handle higher diffusing power to reduce the speckle effect, e.g. as described by international patent publication WO2012/139634 A1. Further, it is sufficient with one set of correction optics (starting from member 9) instead of applying corrections to each separate cluster light beam. This reduces light loss, cost and system complexity.

Figure 3:
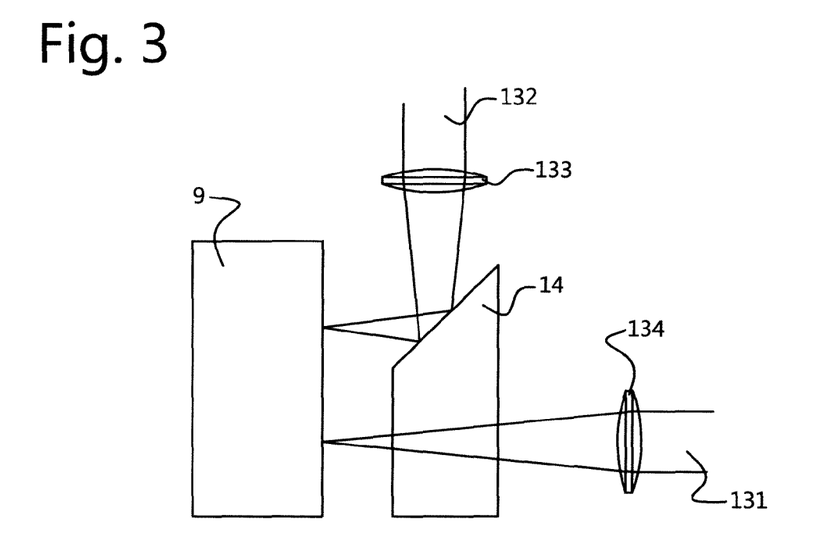
FIG. 3 shows an embodiment of the present invention where two white beams are combined into an optical component.

FIG. 3 shows an example of an embodiment of the present invention where the optical component 9 is an integrator rod. If the aspect ratio of this integrating rod is about 2:1, it is possible to focus two beams onto the integrator rod. 133 and 134 are converging lenses.

Figure 4:
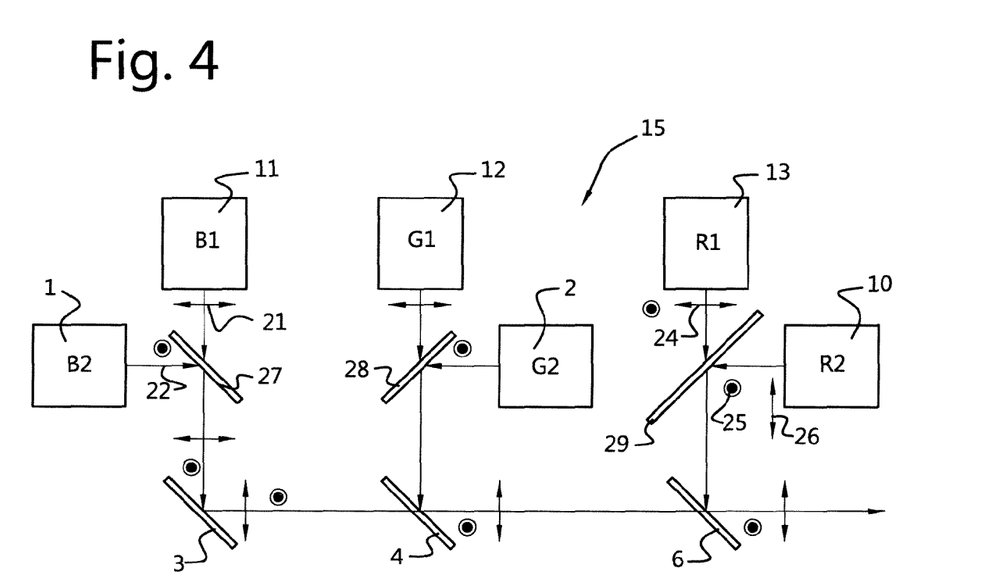
FIG. 4 shows an embodiment of the present invention where different polarization of the same color is used.
Figure 5A:
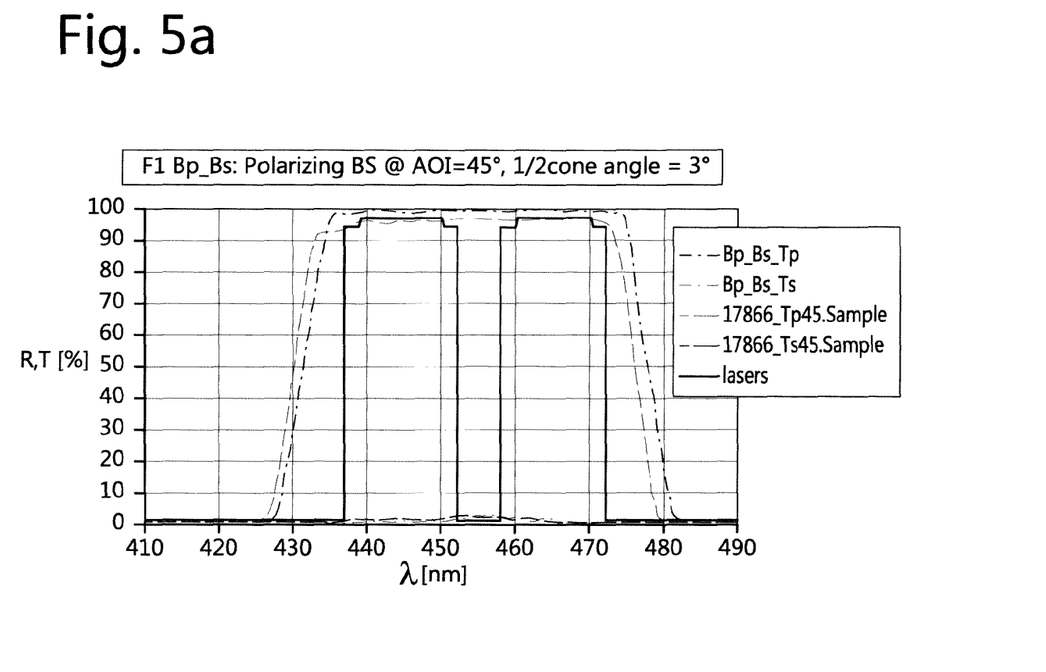
FIGS. 5a, 5b, and 5c show transmission and reflection spectra of filters implement in an embodiment of the invention.
Figure 5B:
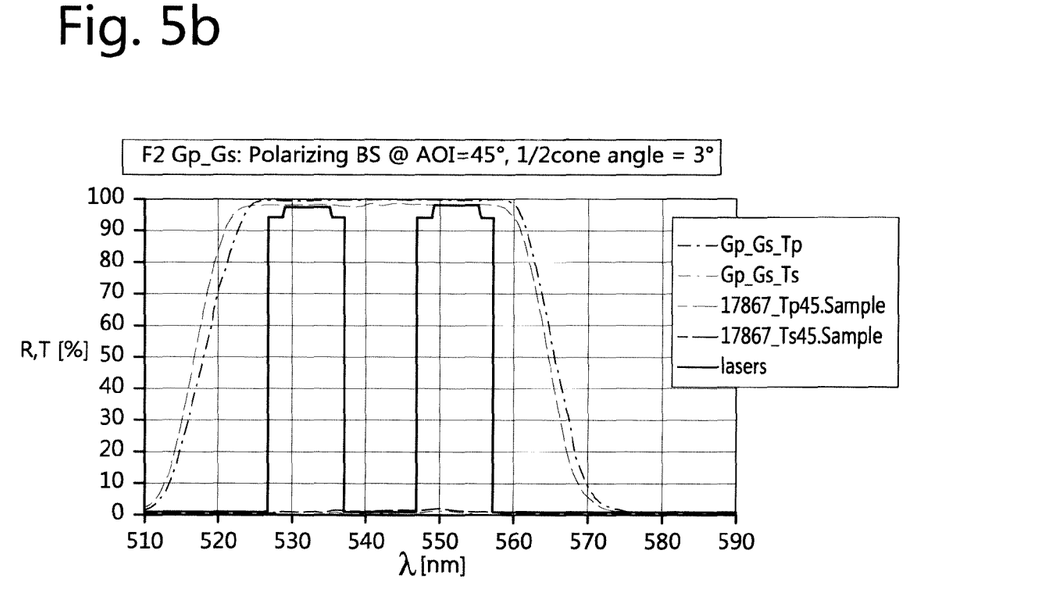
Figure 5C:
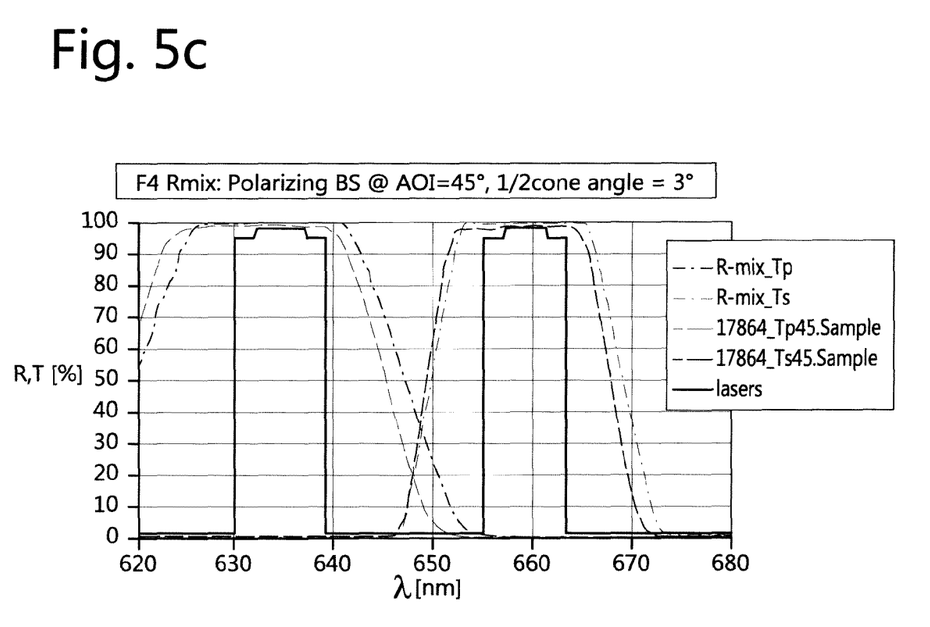

FIG. 4 shows an embodiment of the present invention where 6 individual beams are combined into one white cluster beam. Individual beams 1, 2 and 10 are s polarized 22 and beams 11, 12 and 13 being p polarized 21. Beams 13 and 10 are a special case where each light beam contains two wavelength bands with different polarization. In this specific case, the band with shorter wavelengths is s polarized and that with longer wavelengths are p polarized. The mirror or filter 29 therefore needs to have a sharp transition in the gap between the two wavelength ranges, see FIG. 5 c). FIGS. 5 a) and b) shows the filters or mirrors 27 and 28.

The two independent polarizations for each primary cluster makes it possible to take advantage of polarization diversity, the larger wavelength range (be it discrete wavelengths or more continuous spectrum e.g. from direct semiconductor lasers) uses the effect of polarization diversity while the combination of several discrete laser sources in a small etendue space allows the use of angular diversity.

Figure 6A:
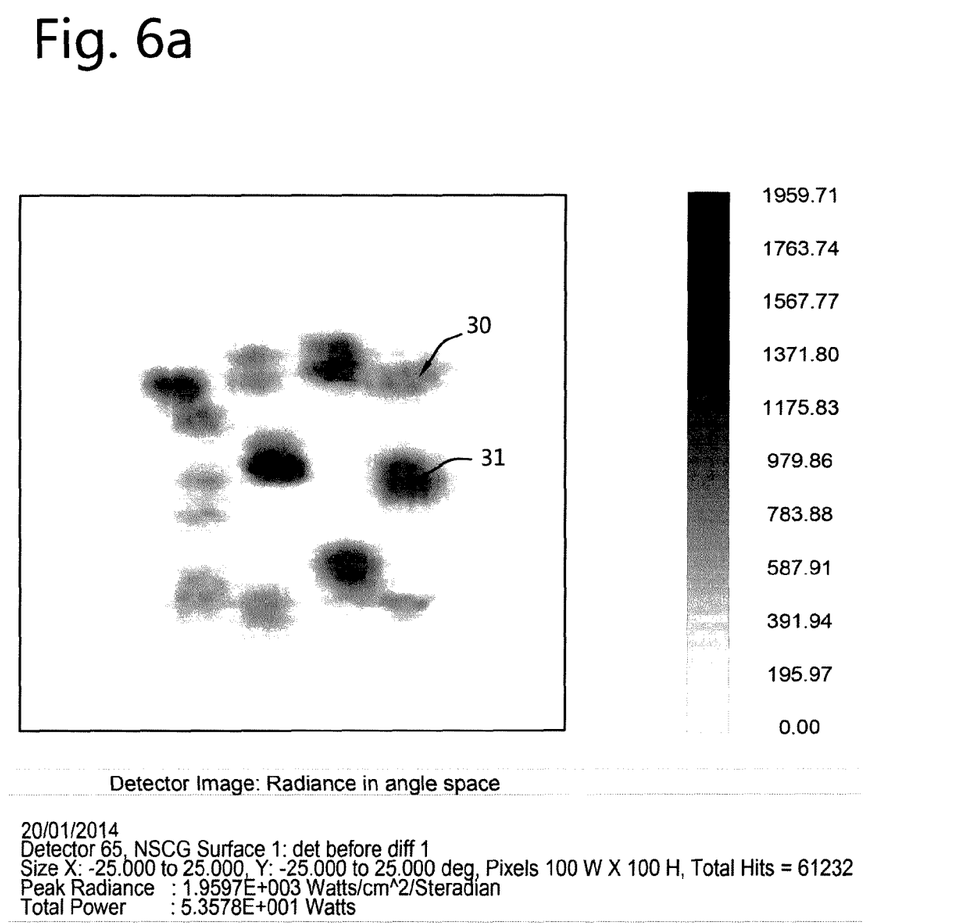
FIGS. 6a and 6b show a cluster beam transmission of an embodiment of the present invention before and after passing a diffusing component.
Figure 6B:
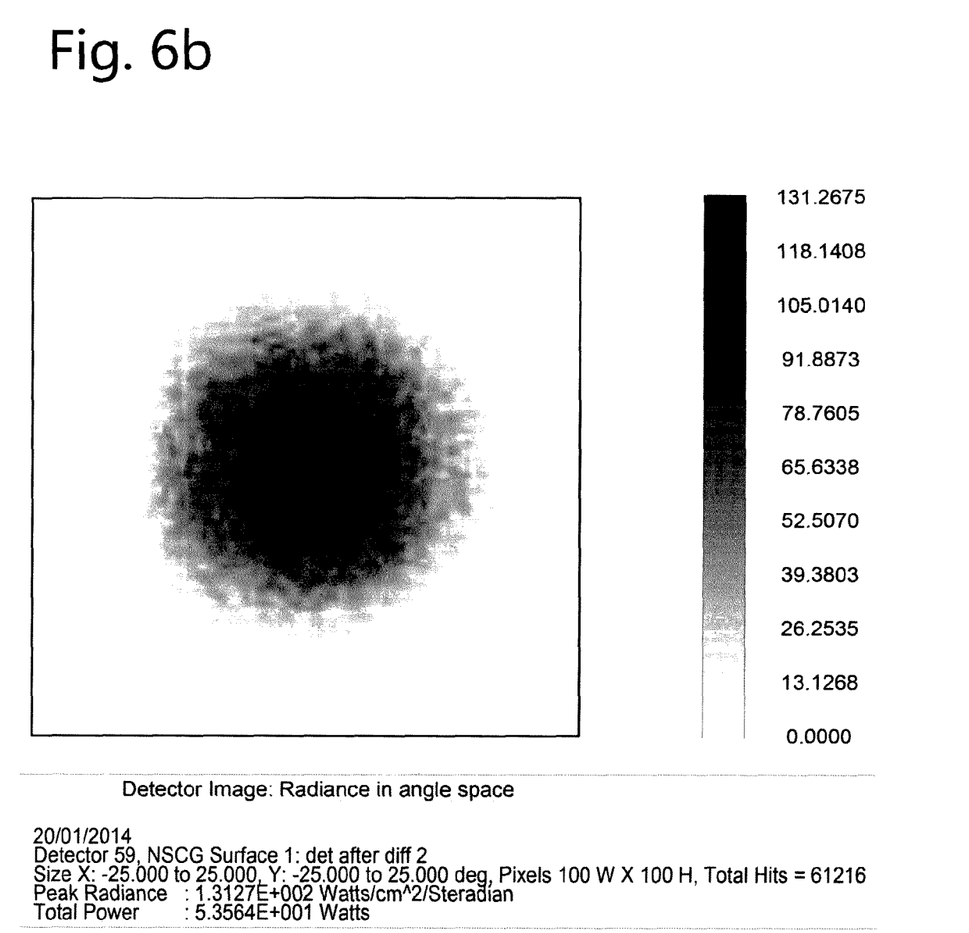

FIG. 6 a) shows an embodiment of the present invention where spots 30 from separate laser beams as well as gaps 31 between them are visible. This could be light from white beams or a single color. FIG. 6 b) shows the same system after diffusing. Individual laser beam spots 30 are no longer visible.

The present invention first creates a quasi-collimated (white) beam. However, this can be done for the individual colors as well (e.g. laser phosphor, . . . ) which is focused to a small spot. This creates multiple angles since the position of a discrete laser beam is translated to an angle. The result is an angular distribution with angular hotspots, i.e. only light at discrete angles, zero light in between these angles, as in FIG. 6. By using diffusors the angular distribution can be made more uniform. There is however a trade-off between the power of diffusing and the throughput of the projections system. The projection system is designed for a certain f-number (and therefore etendue), any light that falls outside of this etendue space will be lost. On the other hand will stronger diffusers result in a more uniform angular distribution and better speckle performance. Hence the reason to keep the etendue of the white laser beam as small as possible to allow for stronger diffusers without the loss of light.

The difficulty in combining two or more different light sources for a projection system is that differences in beam size and/or beam divergence (and other optical parameters) might give rise to undesired color and brightness uniformity issues. For example in digital cinema, for Digital Light Processing based systems the f-number of the center of the Digital Micromirror Device is f2.5 where at the edges this is f4.5. If there is a difference in aperture filling over the different colors a color shift will be noticeable towards the edges. This difference can originate from a difference in starting etendue of the system, or even just from a different beam size or beam divergence. A big enough difference in either parameter will result in a different spatial and angular uniformity between the laser sources at the plane of the imager.

For example, in case of using a double integrator described in WO2012/139634; if one beam has a smaller beam size than the other one this will mean that the focused spot onto the (first) integrator will have a smaller angular extent for the smaller beam. This would result in less reflections (and therefor possible a reduced uniformity) at the exit of the double integrator. Further, the aperture filling of both beams could be different which could give rise to color differences on screen.

The aim of the present invention is therefore to have the same response for the primary beams on the imager with respect to brightness and color uniformity. Starting with beams with such equal properties, it is possible to use a common illumination path optimized towards geometric efficiency for the contributing colors.

Figure 7:
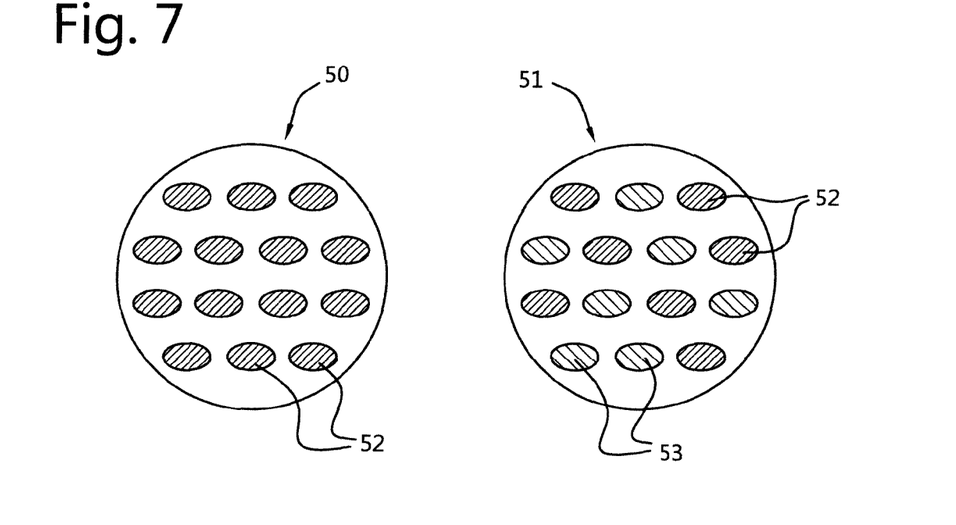
FIG. 7 shows two types of cluster beams of an embodiment of the present invention.

FIG. 7 shows an embodiment of the present invention where the individual beams are a) monochromatic with spots 52 of one wavelength and b) contain spots 52 and 53 of different wavelengths. Also in this case it is important to have equal angular and brightness uniformity on the imaging system. In the present invention there is employed in each cluster beam 2 distinct wavelength bands (and within each wavelength band a minimum of 2 smaller wavelength ranges). Each of these wavelength bands within a cluster beam could be considered as a beam on their own, which would require the beams to comply with the same requirements as if the beam would be considered as monochromatic. As is the case with a monochromatic beam the spacing between the individual laser beams in the bigger beam (which translates to angle separation after the focusing lens) has to be smaller or equal than what would be required to take full advantage of the total diffusing power in the illumination path, in order to achieve the desired f number and aperture uniformity. This can in turn be translated to color and brightness uniformity on the screen. This means that the difference in angle between 2 light beams after the focusing lens has to be sufficiently small so that, after the diffusing and uniformization elements in the illumination path, the individual laser sources cannot be distinguished anymore, as in FIG. 6 b). The lasers are also distributed symmetric in the beam profile as this allows to cope with fault conditions (e.g. if one laser fails it can be compensated by its symmetric counterpart). The overall distribution of the lasers in the beam should be such that combined with the total diffusing power the resulting aperture is as uniformly filled as possible for all constituting wavelengths.

Figure 8:
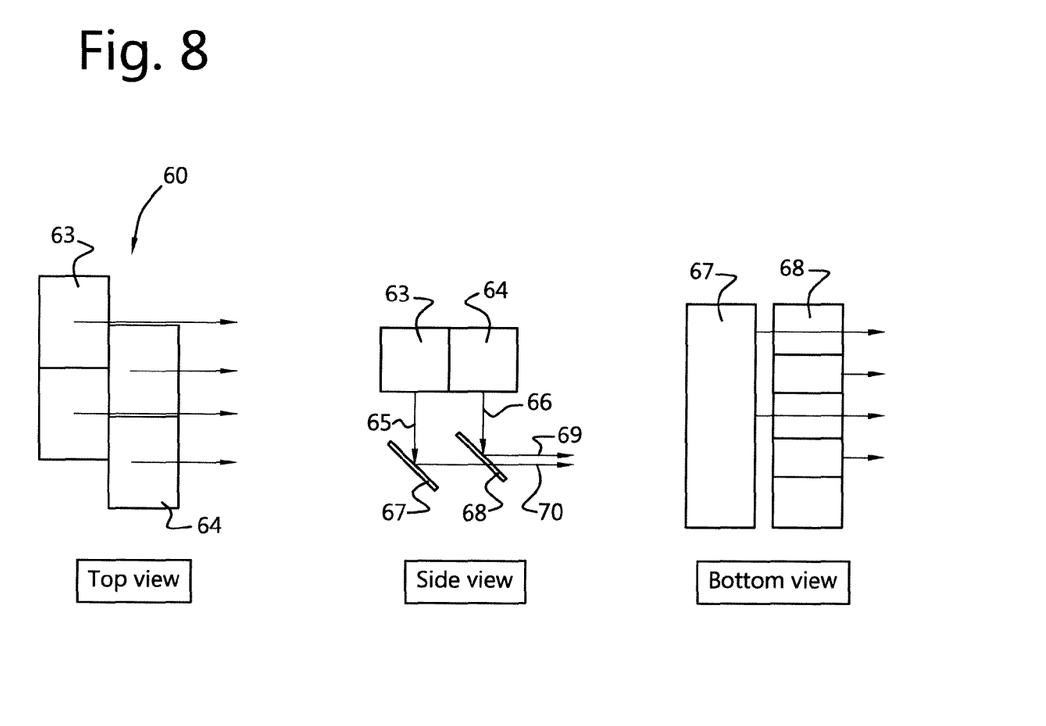
FIGS. 8, 9 and 10 show a laser and mirror configuration of an embodiment of the present invention.
Figure 9:
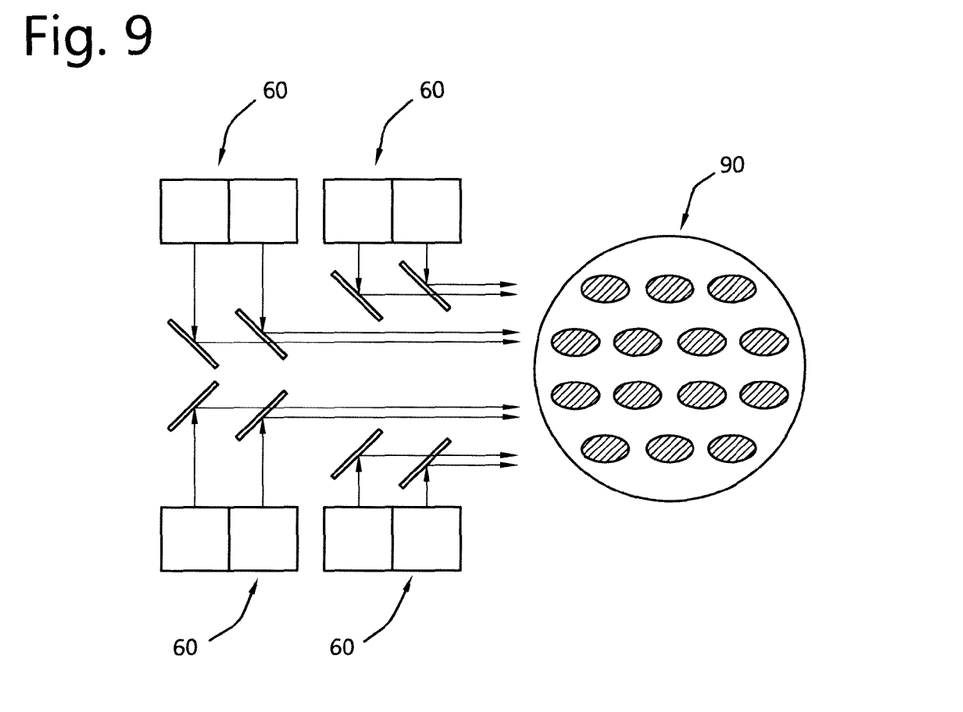

As one of the goals is to minimize the initial etendue of the white beam we also need to minimize the etendue of the individual beams. Typically one of the laser beams will be the limiting factor in that its can not be reduced beyond a certain limit. In turn, it makes no sense to reduce the etendue of the other beams further beyond that limit. In the embodiment of FIG. 2, this is beam 2 and 12. In this exemplary embodiment the laser packages are relatively large, as well as the emitted beams per laser. FIG. 8 shows so-called cross-walk mirrors 67 and 68. These are employed with two rows 63 and 64 of 2 lasers each. The light of the first row of lasers 63 is folded using a standard mirror 67 and aimed in the space between the two laser beams of the second row 64. By making a mirror 68 that has interchanging patched of high transmission and high reflection the laser beams of row 63 and 64 can be combined. With this technique a tightly filled aperture like in FIGS. 6 a) and 7 is created. FIG. 9 illustrates how 4 units 60 have been put together resulting in the distribution 90.

Figure 10:
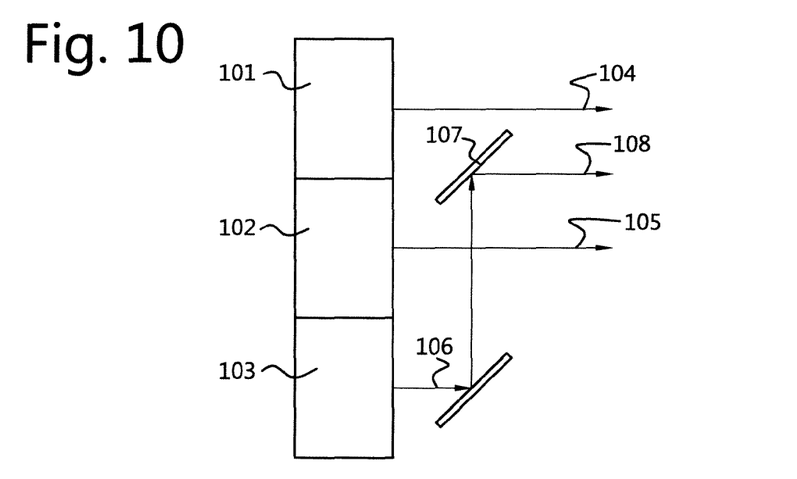

For the beams 10 and 13 in FIG. 2 the situation is different since the size of these laser packages allow for a tighter packaging but their divergence is higher. The solution is to minimize the initial size of the cluster beam and then use a beam expander to match with the other cluster beams. FIG. 10 shows three lasers 101, 102 and 103 and their respective beams 104, 105 and 106. The mirrors 107 and 108 folds the beam 106 so that it ends up between the beams 104 and 105.

Once two clusters of every color are combined by means of polarization, low pass dichroic filters, e.g. dichroic mirrors 3, 4, and 6 in FIG. 2, are used to create first a cyan and then a white beam.

While the invention has been described hereinabove with reference to specific embodiments, this has been done to clarify and not to limit the invention. The skilled person will appreciate that various modifications of the described embodiments are possible without departing from the invention, the scope of which is defined by the attached claims.

The invention claimed is:

1. A light beam projection assembly comprising:
a first two-dimensional cluster of laser illumination sources arranged to provide a first cluster of light beams comprising a multiple of individual first light beams neighboring each other in a two-dimensional distribution, said first cluster having an initial first etendue, and
a second two-dimensional cluster of laser illumination sources arranged to provide a second cluster of light beams comprising a multiple of individual second light beams neighboring each other in a two-dimensional distribution, said second cluster having an initial second etendue, the first and second two-dimensional clusters of light beams each comprising a single color, wherein the initial first etendue is different from the initial second etendue, and means for changing the direction of said first cluster and/or said second cluster of light beams;

wherein said laser illumination sources are arranged so that a total etendue of the first cluster of light beams having the initial first etendue is substantially equal to a total etendue of the second cluster of light beams having the initial second etendue; and wherein the means for changing the direction comprise a mirror system and are arranged so that the clusters of light beams are brought into a combined cluster light beam having substantially the same etendue as the maximum of said initial first etendue and said initial second etendue.

2. The light beam projection assembly according to claim 1, wherein said clusters of laser illumination sources are arranged so that their respective clusters of light beams pass a light deviation system, which changes the direction of one or several individual light beams so that the individual light beams becomes positioned closer to each other and the etendue of the corresponding cluster of light beams is reduced.

3. The light beam projection assembly according to claim 2, wherein said light deviation system comprises the mirror system, the mirror system having a mirror substrate with a coating deposited on selected areas thereof, such that the mirror changes the direction of a selection of the individual light beams.

4. The light beam projection assembly according to claim 1, wherein the laser illumination sources are arranged so that their corresponding light beams pass a beam expander.

5. The light beam assembly according to claim 1, wherein the polarization of the light beams in the first cluster of light beams is different from the polarization of the light beams in the second cluster of light beams.

6. A light beam assembly according to claim 1, wherein the polarization of one of the light beams is altered by rotating the corresponding laser illumination sources by cluster.

7. The light beam assembly according to claim 1, wherein the polarization of the light beams within one cluster of light beams are different from each other.

8. The light beam assembly according to claim 1, wherein a cluster of light beams comprises light around one or more wavelength ranges.

9. The light beam projection assembly according to claim 1, further comprising a third cluster of laser illumination sources arranged to provide a third cluster of light beams, wherein said first cluster of light beams comprises red light beams, wherein said second cluster of light beams comprises blue light beams, wherein said third cluster of light beams comprises green light beams, and wherein said first, second, and third clusters are blended so that the blended light beam appears white.

10. The light beam projection assembly according to claim 2, wherein the laser illumination sources are arranged so that their corresponding light beams pass a beam expander.

11. The light beam projection assembly according to claim 3, wherein the laser illumination sources are arranged so that their corresponding light beams pass a beam expander.

12. A projection system comprising the light beam projecting assembly according to claim 1.

13. A method of projecting light beams comprising:

providing a first two-dimensional cluster of light beams comprising a multiple of individual first light beams neighboring each other in a two-dimensional distribution, said first cluster having an initial first etendue, providing a second two-dimensional cluster of light beams comprising a multiple of individual second light beams neighboring each other in a two-dimensional distribution, said second cluster having an initial second etendue, the first and second two-dimensional clusters of light beams each comprising a single color, wherein the initial first etendue is different from the initial second etendue, and changing the direction of said first cluster and/or said second cluster of light beams by means of a mirror system;

wherein a total etendue of the first cluster of light beams having the initial first etendue is substantially equal to a total etendue of the second cluster of light beams having the initial second etendue; and wherein the clusters of light beams are brought into a combined cluster light beam having substantially the same etendue as the maximum of said initial first etendue and said initial second etendue.

14. The method of projecting light beams according to claim 13, further comprising changing the direction of one or several individual light beams so that the individual light beams becomes positioned closer to each other and the etendue of the corresponding cluster of light beams is reduced.

15. The method of projecting light beams according to claim 13, wherein the polarization of the light beams in the first cluster of light beams is different from the polarization of the light beams in the second cluster of light beams.

16. A method of projecting light beams according to claim 13, further comprising altering the polarization of one of the light beams.

17. The method of projecting light beams according to claim 13, wherein the polarization of the light beams within one cluster of light beams are different from each other.

18. The method of projecting light beams according to claim 13, wherein a cluster of light beams comprises light around one or more wavelength ranges.

19. The method of projecting light beams according to claim 13, further comprising providing a third cluster of light beams, wherein said first cluster of light beams comprises red light beams, wherein said second cluster of light beams comprises blue light beams, wherein said third cluster of light beams comprises green light beams, and wherein said first, second, and third clusters are blended so that the blended light beam appears white.

20. The light beam projection assembly according to claim 1, wherein an angular spread of the different clusters of light beams is configured to be relatively uniform so that each individual light beam is distributed uniformly across a cross-section of the combined cluster light beam.

* * * * *